(12) United States Patent
Stemm

(10) Patent No.: US 10,215,311 B2
(45) Date of Patent: Feb. 26, 2019

(54) FORM-IN-PLACE ANTI-CRUSH RING

(71) Applicant: ABC Group Inc., Toronto (CA)

(72) Inventor: Michael Stemm, Lapeer, MI (US)

(73) Assignee: ABC GROUP INC., Toronto, ON (CA)

(*) Notice: Subject to any disclaimer, the term of this patent is extended or adjusted under 35 U.S.C. 154(b) by 133 days.

(21) Appl. No.: 15/317,853

(22) PCT Filed: Jun. 10, 2015

(86) PCT No.: PCT/US2015/035006
§ 371 (c)(1),
(2) Date: Dec. 9, 2016

(87) PCT Pub. No.: WO2015/191658
PCT Pub. Date: Dec. 17, 2015

(65) Prior Publication Data
US 2017/0122465 A1    May 4, 2017

Related U.S. Application Data

(60) Provisional application No. 62/010,152, filed on Jun. 10, 2014.

(51) Int. Cl.
*F16L 57/02* (2006.01)
*F16L 9/128* (2006.01)
(Continued)

(52) U.S. Cl.
CPC ............... *F16L 9/128* (2013.01); *B23P 19/00* (2013.01); *F02M 35/10124* (2013.01); *F02M 35/10137* (2013.01); *F16L 57/02* (2013.01)

(58) Field of Classification Search
CPC ................................ B65D 59/00; B65D 59/02
(Continued)

(56) References Cited

U.S. PATENT DOCUMENTS

| 3,370,615 A | 2/1968 | Tamaki et al. |
| 5,029,907 A * | 7/1991 | Gundy ..................... E03F 3/04 16/225 |

(Continued)

FOREIGN PATENT DOCUMENTS

| DE | 34 18 420 | 1/1985 |
| DE | 88 11 706 | 10/1988 |

(Continued)

OTHER PUBLICATIONS

International Search Report and Written Opinion dated Aug. 21, 2015 in PCT/2015/035006.
(Continued)

*Primary Examiner* — Patrick F Brinson
(74) *Attorney, Agent, or Firm* — Medler Ferro Woodhouse & Mills PLLC

(57) ABSTRACT

An anti-crush ring is disclosed for insertion into hollow articles for localized reinforcement. The anti-crush ring comprises a generally annular or ring-like wall structure and at least one expansion hoop inwardly extending from the wall structure. Upon insertion of the anti-crush ring into the hollow article, the at least one expansion hoop is compressed and deformed to urge the wall structure of the anti-crush ring against an inner surface of the hollow article. Also provided is a method of reinforcing the inlet or outlet of a hollow article.

9 Claims, 5 Drawing Sheets

(51) Int. Cl.
*F02M 35/10* (2006.01)
*B23P 19/00* (2006.01)

(58) Field of Classification Search
USPC ............ 138/172; 24/268, 270, 271; 285/370
See application file for complete search history.

(56) References Cited

U.S. PATENT DOCUMENTS

| | | | | |
|---|---|---|---|---|
| 5,150,927 | A | * | 9/1992 | Skinner .................... F16L 5/10 |
| | | | | 24/20 EE |
| 5,507,500 | A | | 4/1996 | Skinner et al. |
| 5,738,359 | A | * | 4/1998 | Gundy .................... B25B 27/00 |
| | | | | 24/20 R |
| 2005/0155189 | A1 | * | 7/2005 | Komai .................... E03F 5/021 |
| | | | | 24/19 |
| 2012/0125472 | A1 | | 5/2012 | Pinkalla et al. |

FOREIGN PATENT DOCUMENTS

| | | |
|---|---|---|
| DE | 8811706 | 10/1988 |
| EP | 0 360 319 | 3/1990 |
| JP | S56 174784 | 12/1981 |
| WO | 82/01489 | 5/1982 |

OTHER PUBLICATIONS

Supplementary European Search Report issued in EP Application No. 15 80 6404, dated Oct. 23, 2017.

\* cited by examiner

FORM-IN-PLACE ANTI-CRUSH RING

FIELD OF THE INVENTION

The present invention relates to the field of air ducts, and in particular to an automotive turbo duct incorporating a form-in-place anti-crush ring.

BACKGROUND

A basic principle in a turbocharged engine system is that wasted energy is converted back into work. In general terms, this is achieved by harnessing the engines exhaust gases to drive a turbine wheel within a turbo housing, thus spinning a compressor wheel directly attached to the turbine by a common shaft, thereby compressing ambient air. This compressed air is delivered back into the engine's air intake system through a turbo duct, thereby delivering a greater mass of air for each intake stroke. The end effect is increased engine power output and/or fuel efficiency.

In the effort to move towards light-weight materials, automotive systems including engine systems have seen the incorporation of increased thermoplastic materials. While effective in many applications, their use in engine systems comes with certain challenges. The need to withstand increased heat and exposure to chemicals is driving the industry to explore new high performance compositions. As such, there are a growing number of engine components now being manufactured from polymeric materials.

In such systems, a known issue with thermoplastic materials is material creep. Material creep is the slow continuous deformation of a solid under the action of a constant load, and is known to be more pronounced at high temperatures. In an engine system, in particular with thermoplastic structures associated with elevated temperatures, the ability to ensure overall system integrity becomes a challenge. While the use of clamps and other connection hardware can be effectively implemented, over time the secure connections can become loose, with increased risk of system leakage and/or failure.

Having regard to air induction systems and turbo ducts in particular, the delivery of compressed air at elevated temperatures creates an overall condition that is at increased risk of system integrity failure due to material creep. In a turbo system, the inability to maintain the compressed ambient air results in a loss of power output and/or fuel efficiency, thereby negating the gains of a turbocharged system. Accordingly, there is a growing need to improve unit connectivity in thermoplastic systems such as the turbo and air induction system in automobiles.

SUMMARY OF THE INVENTION

According to an embodiment, provided is an anti-crush ring for insertion into hollow articles for localized reinforcement. The anti-crush ring comprises a generally annular ring-like wall structure and at least one expansion hoop incorporated into the wall structure. Upon insertion of the anti-crush ring into the hollow article, the at least one expansion hoop is compressed and deformed to urge the anti-crush ring against an inner surface of the hollow article.

According to another embodiment, provided is a method of reinforcing an inlet or outlet end of a hollow article. The method comprises inserting into an open end of the hollow article an anti-crush ring defining a generally annular ring-like wall structure and at least one expansion hoop incorporated into the wall structure. Upon insertion, the at least one expansion hoop is compressed to urge the anti-crush ring against an inner surface of the hollow article.

BRIEF DESCRIPTION OF THE DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF EMBODIMENTS OF THE PRESENT INVENTION

Specific embodiments of the present invention will now be described with reference to the Figures, wherein like reference numbers indicate identical or functionally similar elements. The following detailed description is merely exemplary in nature and is not intended to limit the invention or the application and uses of the invention. A person skilled in the relevant art will recognize that other configurations and arrangements can be used without departing from the scope of the invention. Although the description and drawings of the embodiments hereof exemplify the technology as applied to automotive turbo ducts, the invention may be applied in other automotive applications, i.e., air inductions ducts, HVAC ducts, etc. In addition, the invention may be used in a variety of non-automotive applications where the articles in question, in particular hollow articles require additional support at coupling points, e.g. inlet/outlet ports, to resist deforming under load from a clamp or similar restraining device. Furthermore, there is no intention to be bound by any expressed or implied theory presented in the preceding technical field, brief summary or the following detailed description.

In the following, the form-in-place anti-crush ring is exemplified as applied to a blow-molded automotive turbo duct. It will be appreciated however that the form-in-place anti-crush ring may be applied to turbo ducts manufactured using other molding technologies, including but not limited to injection molding. The automotive turbo duct is formed of thermoplastic material, and is generally of one-piece form. Where the turbo duct cooperates with suitable couplers for attachment of the turbo duct into the engine assembly, additional anti-crush reinforcement may be necessary. Reinforcement may be provided using one or more anti-crush rings, as described in greater detail below.

Figure 1:
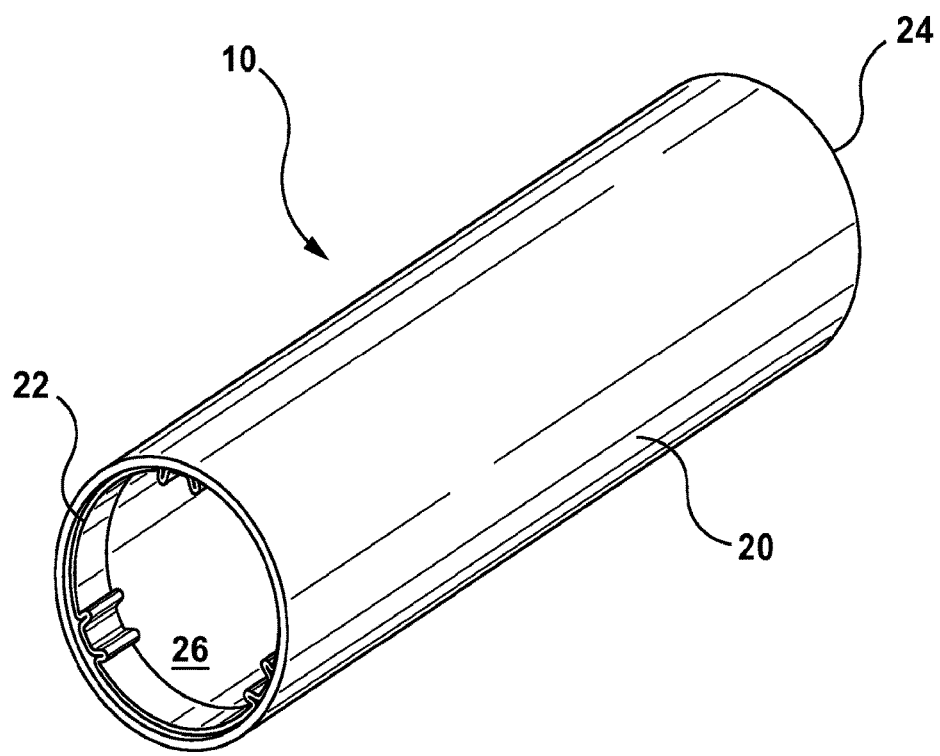
FIG. 1 is a perspective view of an exemplary automotive turbo duct having a form-in-place anti-crush ring.
Figure 2:
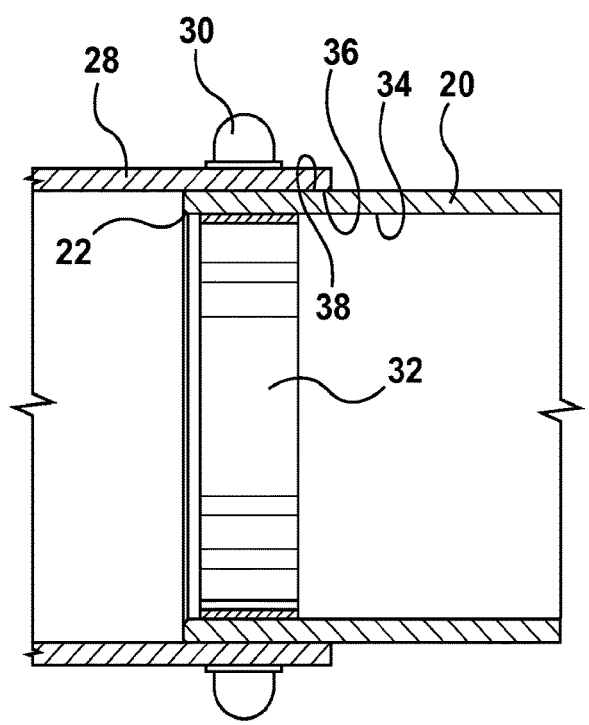
FIG. 2 is a side sectional view of the turbo duct of FIG. 1.

Turning now to FIG. 1, a simplified turbo duct 10 is shown as having a primary body 20 that provides an inlet end 22, an outlet end 24, and an internal air passage way 26 that communicates therebetween. In an engine system, turbo duct 10 may find application in a variety of positions. One exemplary arrangement is for a hot-side turbo duct where inlet end 22 is coupled to an outlet of a turbocharger (not shown), while outlet end 24 is coupled to an inlet of an intercooler (not shown). As shown in FIG. 2, inlet end 22 is generally dimensioned to receive a cuff 28, with cuff 28 being securely retained in place by way of one or more suitable clamps 30, e.g., band clamps, T-bar clamps, etc. The opposing side of cuff 28 (details not shown) would also use a similar cuff/clamp arrangement for attachment to respective components, i.e. turbocharger, intercooler, etc., in the engine system. It will be appreciated that for the purpose of clarity, FIG. 2 presents inlet end 22 only, and that outlet end 24 may be similarly configured.

In general, clamp 30 exerts a radially inward compressive force upon cuff 28, which in turn engages primary body 20 of turbo duct 10 thus securing it thereto. To ensure a secure connection, the inward compressive radial force can be considerable, thus subjecting the connection points, namely inlet and outlet ends 22, 24 to considerable stress.

Continuing with FIG. 2, inlet end 22 presents an anti-crush ring 32. Anti-crush ring 32 is positioned on an inside surface 34 of primary body 20 of turbo duct 10, in radial alignment with clamp 30. In this way, on application of radially inward compressive forces upon cuff 28, a secure attachment can be attained between sealing surfaces 36, 38 of cuff 28 and primary body 20, respectively, without risk of inward compressive deformation of turbo duct 10.

Figure 3:
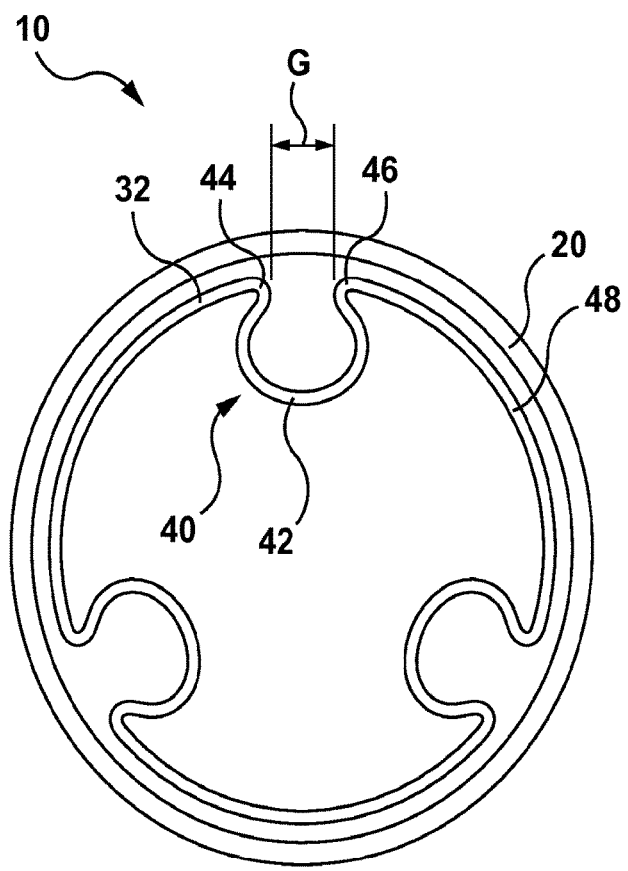
FIG. 3 is an end view of an inlet end of the turbo duct of FIG. 1.

Turning now to FIG. 3, anti-crush ring 32 is inserted into turbo duct 10 following the molding process and any required post-mold finishing. In accordance with embodiments hereof, an anti-crush ring 32 is provided with at least one expansion hoop 40, and the anti-crush ring generally exhibits an overall outside diameter that ranges from slightly greater to slightly less than an inside diameter of primary body 20 of turbo duct 10. As shown in the embodiment of FIG. 3, an outside diameter of a generally annular or ring-like wall structure 48 of anti-crush ring 32 is slightly less than the inside diameter of primary body 20, and anti-crush ring 32 includes three expansion hoops 40 that inwardly extend from the wall structure 48. As shown in FIGS. 3-5, the wall structure 48 is comprised of several segments that form an outer portion, perimeter or circumference of anti-crush ring 32 with the three expansion hoops 40 equally spaced about the circumference of the anti-crush ring 32 to extend inwardly from adjacent segments of the wall structure 48.

Each expansion hoop 40 is configured as an open or discontinuous ring-like structure having a body 42 of a generally annular or ellipsoidal shape with an opening or gap G therein. The opening or gap G of the annular body 42 is situated between first and second transitions or bends 44, 46 that join the open ring-like structure of a respective expansion hoop 40 to respective adjacent segments of the annular wall structure 48 of anti-crush ring 32. Stated another way, respective first and second transitions 44, 46 are generally separated by a respective gap G between adjacent segments of the annular wall structure 48. Expansion hoop 40 provides flexibility to anti-crush ring 32, wherein the ring-like structure of each expansion hoop 40 is sufficiently flexible to permit slight adjustment in gap G when necessary. For example, where the outside diameter of anti-crush ring 32 is slightly greater than the inside diameter of a turbo duct, displacement of first and second transitions 44, 46 towards each other has the effect of reducing gap G and thus the overall outside diameter of anti-crush ring 32, thereby permitting insertion.

Figure 4A:
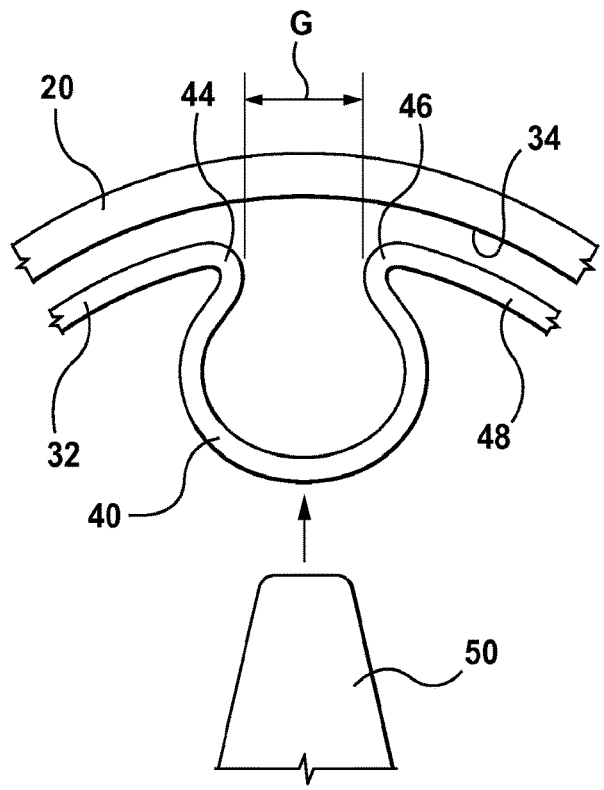
FIGS. 4a and 4b are detailed views of an expansion hoop provided on the anti-crush ring, showing the expansion hoop both prior to and during compression using a suitable compression tool.
Figure 4B:
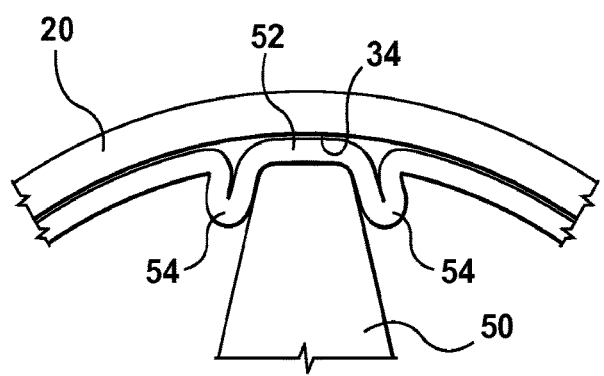
Figure 5:
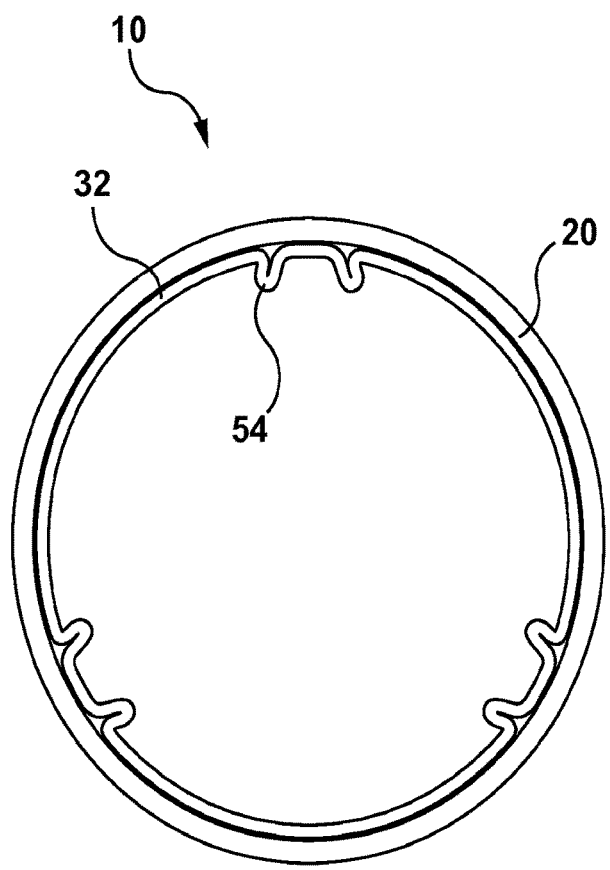
FIG. 5 is an end view similar to FIG. 3 showing the expansion hoops deformed radially outwardly to lock the anti-crush ring in position in the turbo duct.

Once anti-crush ring 32 has been correctly positioned within primary body 20 of turbo duct 10, each expansion hoop 40 is subject to compression/deformation using a suitable tool 50, as shown in FIGS. 4a & 4b. On compression, tool 50 deforms the ring-like body towards the turbo duct inside surface 34, generally filling gap G. In doing so, first and second transitions 44, 46 displace away and outwardly from each other, having the effect of expanding the outside diameter of anti-crush ring 32, thereby urging wall structure 48 firmly against the inside surface 34 of primary body 20. As will be noted, a gap-filling portion 52 of the ring-like body 42 of the expansion hoop 40 engages the inside surface 34 of primary body 20, with gap G being filled. The compression and deformation of the ring-like body 42 also forms wedges 54 proximal first and second transitions 44,46 that serve to retain portion 52 in place, having the effect of locking anti-crush ring 32 in the expanded position against turbo duct 10, for example as shown in FIG. 5.

Tool 50 may take on a variety of forms. Of importance is that tool 50 be configured to apply sufficient compressive force upon expansion hoop 40 to drive and set permanently the ring-like structure against the inside surface 34 of primary body 20, as detailed above. In one exemplary form, tool 50 may be configured as a manually operated plier-type mechanism, having a suitable bearing surface that supports the outside surface of primary body 20 during compression. In another exemplary configuration, tool 50 may be a pneumatically or hydraulically-operated compression station that presents a bearing surface to support the outside surface of primary body 20, and a cooperating mandrel element configured with displaceable segments to provide the required compressive forces on the expansion hoops 40.

It will be appreciated that while the embodiment presented above presents three expansion hoops 40 and three segment of annular wall structure 48, other embodiments may implement a fewer or greater number of expansion hoops and wall structure segments. For some applications, a single expansion hoop may be suitably implemented between a non-segmented or single annular wall structure 48.

It was previously mentioned that turbo duct 10 may be blow molded. A range of suitable materials may be used to form the turbo duct, the selection of which will depend on the required performance characteristics. Exemplary materials include, but are not limited to polypropylene, polyethylene, nylon, polyphenylene ether (PPE), polyphenylene sulfide (PPS), and combinations thereof. These materials are both commercially available and under development addressing specific areas of thermal plastic conversion such as improved thermal oxidative properties associated with high heat and a low pH operating environment, improved burst characteristics associated with turbo charger surge pressures and improved creep and shrink resistance to hold dimensional capability of the molded component.

For anti-crush ring 32, suitable materials include those not susceptible to material creep, including, but not limited to, stainless steel, light-weight aluminum, magnesium and hybrid steel alloys developed for weight savings.

The form-in-place nature of anti-crush ring 32 permits a single sized anti-crush ring to be used with a range of inside diameters of recipient turbo ducts. As such, during assembly of an engine system, a reduction in inventory parts can be achieved, particularly where the engine system implements ducting having variable inlet/outlet sizing. The fact that the anti-crush rings are applied to hollow articles once they are fully formed and finished increases overall cycle time as inserts are not required to be placed in the mold tool, and reduces the likelihood of material wastage due to molding failures. Once again this permits for reduced inventory, and realization of associated cost savings.

Those familiar with blow molding will appreciate that control of the inside diameter of hollow articles is difficult, as variation in inside diameter are inherent in the manufacturing process. As such, post-mold processing, i.e., machining, is often necessary to achieve a desired inside diameter, particularly in critical regions such as coupling points. With the anti-crush ring described herein, variations in inside diameter are accommodated as the anti-crush ring is capable of being formed-in-place to fit a range of inside diameter dimensions. This eliminates the additional step post-mold processing to achieve a specific inside diameter, thus removing from the manufacturing process the potential for debris in the finished article. In turn, this leads to improved manufacturing cycle times, reduces wastage, and possible reductions in quality rejections and product recall due to debris issues.

While various embodiments according to the present invention have been described above, it should be understood that they have been presented by way of illustration and example only, and not limitation. It will be apparent to persons skilled in the relevant art that various changes in form and detail can be made therein without departing from the scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other combination. All patents and publications discussed herein are incorporated by reference herein in their entirety.

What is claimed is:

1. An anti-crush ring for insertion into hollow articles for localized reinforcement, the anti-crush ring comprising:
   a wall structure forming a generally annular shape; and
   at least one expansion hoop incorporated into the wall structure, the at least one expansion hoop being configured as an open ring-like structure joined to the wall structure at a first transition and a second transition, the first and second transitions being separated by a gap,
   wherein upon insertion of the anti-crush ring into the hollow article, the at least one expansion hoop is configured to be compressed and deformed to urge the anti-crush ring against an inner surface of the hollow article, and
   wherein upon compression, a gap-filling portion of the at least one expansion hoop engages the inner surface of the hollow article, the gap-filling portion being locked in position at each end by a respective wedge formed proximal the first and second transitions.

2. The anti-crush ring according to claim 1, wherein the open ring-like structure has a body of an annular or ellipsoidal shape.

3. The anti-crush ring according to claim 1, wherein the at least one expansion hoop is flexible to permit adjustment of the gap between the first and second transitions.

4. The anti-crush ring according to claim 1, wherein the anti-crush ring is made of a material selected from the group of stainless steel, light-weight aluminum, magnesium and a hybrid steel alloy.

5. The anti-crush ring according to claim 1, wherein the generally annular wall structure defines an outside diameter that is smaller than an inside diameter of the hollow article being reinforced.

6. The anti-crush ring according to claim 1, wherein the generally annular wall structure defines an outside diameter that is slightly larger than an inside diameter of the hollow article being reinforced.

7. A method of reinforcing an inlet end or an outlet end of a hollow article, comprising:
   inserting into an open end of the hollow article an anti-crush ring defining a generally annular wall structure and at least one expansion hoop incorporated into the wall structure, the at least one expansion hoop being configured as an open ring-like structure joined to the wall structure at a first transition and a second transition, the first and second transitions being separated by a gap; and
   compressing the at least one expansion hoop to urge a gap-filling portion of the at least one expansion hoop against an inner surface of the hollow article, the gap-filling portion being locked in position at each end by a respective wedge formed proximal the first and second transitions.

8. The method of claim 7, wherein the open ring-like structure has a body of a generally annular or ellipsoidal shape and whereupon compressing the at least one expansion hoop, the first and second transitions displace away and outwardly therefrom to increase an outside diameter of the anti-crush ring.

9. The method of claim 8, wherein upon compression of the at least one expansion hoop, deformation of the open ring-like structure forms the wedges proximal each of the first and second transitions, thereby locking anti-crush ring in an expanded position.

* * * * *

UNITED STATES PATENT AND TRADEMARK OFFICE
CERTIFICATE OF CORRECTION

| | | |
|---|---|---|
| PATENT NO. | : 10,215,311 B2 | Page 1 of 1 |
| APPLICATION NO. | : 15/317853 | |
| DATED | : February 26, 2019 | |
| INVENTOR(S) | : Michael Stemm | |

It is certified that error appears in the above-identified patent and that said Letters Patent is hereby corrected as shown below:

In the Claims

Column 5, Line 39 (Claim 1): "hollow articles" is to be replaced with --a hollow article--; and Column 6, Line 48 (Claim 9): "locking anti-crush ring" is to be replaced with --locking the anti-crush ring--.

Signed and Sealed this
Sixteenth Day of April, 2019

Andrei Iancu
*Director of the United States Patent and Trademark Office*